Sept. 21, 1926.
B. B. BRIGGS
BEARING
Filed Nov. 21, 1925
1,600,926
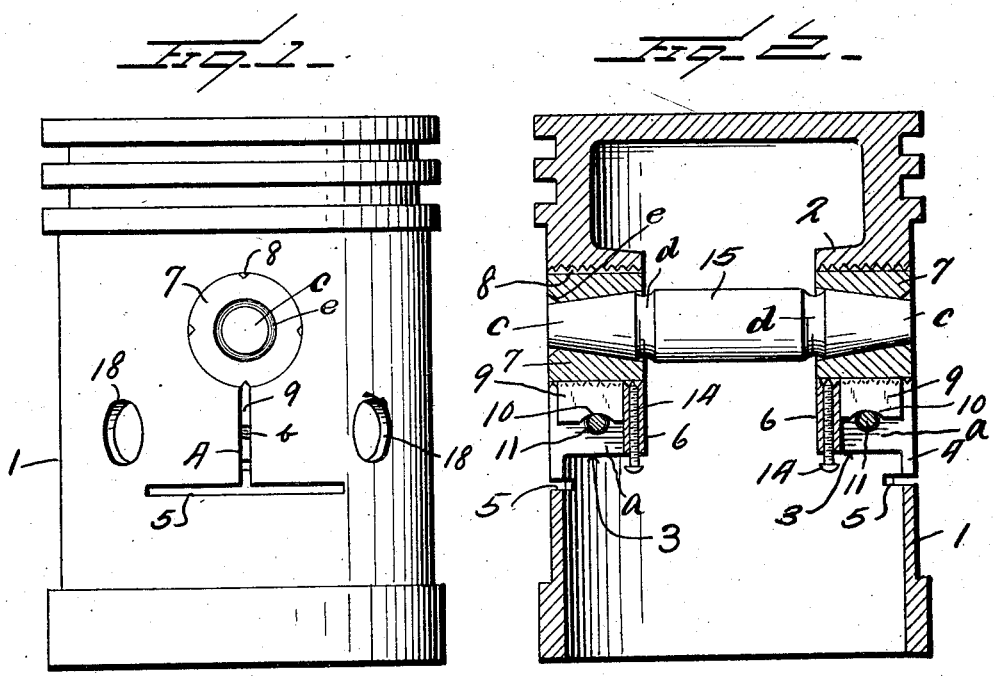
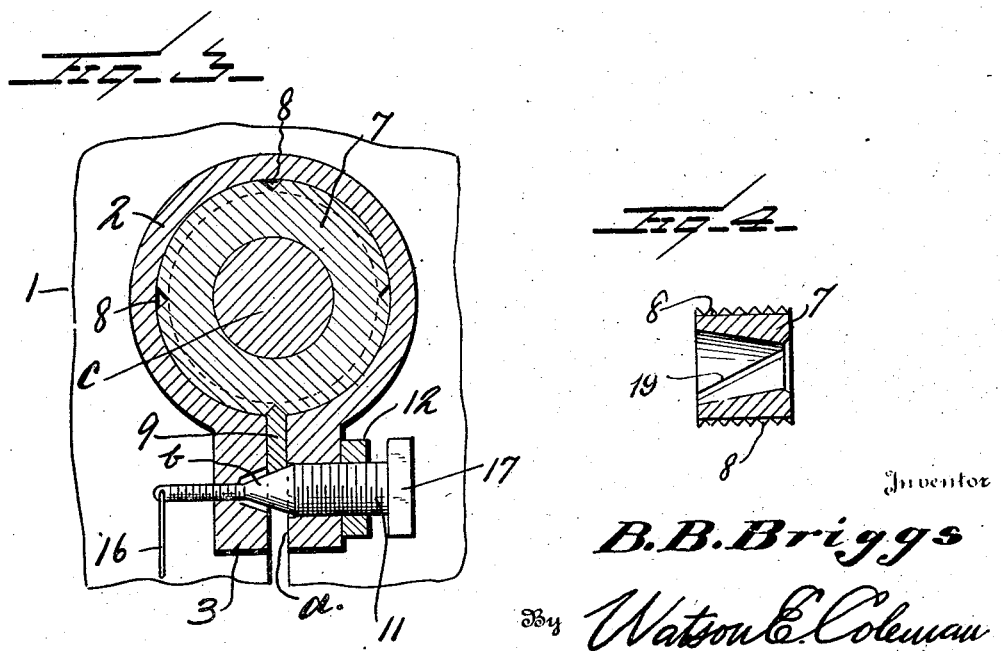
Inventor
B. B. Briggs
By Watson E. Coleman
Attorney Patented Sept. 21, 1926.

1,600,926

UNITED STATES PATENT OFFICE.

BURDETT B. BRIGGS, OF CHICAGO, ILLINOIS.

BEARING.

Application filed November 21, 1925. Serial No. 70,602.

This invention relates to certain improvements in bearings and has relation more particularly to a device of this kind especially designed and adapted for use in connection with a piston or wrist pin such as used in internal combustion engines, and it is an object of the invention to provide a bearing of this kind whereby wear from time to time may be readily taken up.

Another object of the invention is to provide a bearing of this type provided with means for positively securing and locking the same in desired adjusted position and wherein clearance is provided for the adjacent portion of the pin engaged within the bearing to assure perfect adjustment.

The invention consists in the details of construction and in the combination and arrangement of the several parts of my improved bearing whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation illustrating a piston having a bearing applied thereto constructed in accordance with an embodiment of my invention;

Figure 2 is a vertical sectional view taken through the structure as illustrated in Figure 1;

Figure 3 is an enlarged fragmentary view partly in section and partly in elevation illustrating in detail certain features of construction as herein employed;

Figure 4 is a sectional view taken through one of the bushings herein disclosed.

As disclosed in the accompanying drawings, 1 denotes a piston body or shell provided at diametrically opposed points with the inwardly disposed bosses 2 each continued by a radially disposed flange 3 extending toward the open end of the piston body. This flange is longitudinally split, as at $a$, in a direction radial of the body 1, said kerf $a$ being continued by a slot 4 in the wall of the body 1 proper. The lower end of the slot 4 in the wall proper is continued by the circumferentially disposed slot 5 in said wall of the body and extending beyond opposite sides of the slot 4. The outer portion of the kerf of the flange at the inner end thereof is closed, as at 6, for a purpose to be hereinafter referred to.

Threaded in each of the bearing bosses 2 is a bushing 7 the bore of which being tapered from end to end with its larger extremity inwardly disposed. The periphery of this bushing 7 at points spaced circumferentially therearound is provided with the longitudinally disposed grooves 8 substantially V-shaped in cross section and each of which being adapted to register with the inner end of the kerf $a$ which is also disposed through the wall of the boss 2.

A locking plate 9 is arranged within the inner portion of the kerf $a$ and is adapted to be moved to seat within a groove 8 to hold the applied bushing 7 against rotation within the boss 2. The outer margin of the plate 9 at its central portion is provided with a recess 10 in which is received the intermediated tapered portion $b$ of an adjusting screw 11. The adjusting screw at opposite sides of its tapered portion $b$ is screw-threaded and the outer reduced portion of the adjusting screw is in threaded engagement with the flange 3 at one side of the kerf $a$ while the opposite larger end portion of the adjusting screw is freely disposed through the flange 3 at the opposite side of said kerf. By rotating the adjusting screw 11 in one direction, the tapered portion $b$ thereof will cause the locking plate 9 to move inwardly of a groove 8 in the bushing and thereby effectively hold said bushing against turning movement within the boss 2. The larger end portion of the adjusting screw 11 has threaded thereon a lock nut 12 which, when in contact with the adjacent face of the flange 3, effectively holds the adjusting screw 11 against accidental displacement.

The bushing 7 is further held in applied position by the screw bolt 14 which extends within the kerf $a$ of the flange 3 and is threaded through the portion 6 thereof.

The outer ends of the grooves 8 provide openings whereby a spanner wrench or kindred tool may be engaged with the bushing when it is desired to adjust the same within the boss 2.

Each of the bushings 7 snugly receives a tapered end portion of a wrist or crank pin 15 and the inner or larger end of each of said tapered portions $c$ is defined by an annular recess or groove d disposed circumferentially around the pin. This groove or recess provides a clearance for the inner or bell end of the adjacent bushing. As disclosed in the accompanying drawings, the larger or bell end of the bushing projects beyond the inner or larger diameter of the tapered portion c of the pin 15. It is obvious that without such clearance at this point on the wrist pin a collar or shoulder would be worn on the pin as a result of the constant friction thereon and which shoulder would prevent the perfect adjustment of the bushing upon the pin.

The outer or smaller end portion of the bore of each of the bushings 7 is enlarged, as at e, whereby the outer or smaller extremity of a tapered portion c of the pin 15 projects beyond the portion of the wall of the bore directly contacting with said tapered portion c. This enlarged portion e also provides a clearance at the outer or smaller extremity of a tapered portion 2 to permit effective adjustment of the bushing in the event said outer extremity of the tapered portion c becomes unduly worn.

As the crank or wrist pin or the bushings 7 wear, said bushings 7 upon proper release can be readily turned in a direction to force the same inward and thereby effect and maintain the desired tension and angle of the pin.

The smaller or extended end portion of the adjusting screw 11 also may have disposed therethrough a suitable pin 16 bent in a manner to have such contact with a part of the piston body to provide further means for holding said adjusting screw 11 against rotation. The larger end of this adjusting screw 11 is also preferably provided with a conventional head 17 whereby a desired implement may be readily engaged therewith for manipulating the same and for which reason the wall of the piston body 1 is provided with a surface hole or opening 18.

The wall of the bore of each of the bushings 7 is also preferably provided with oil grooves to facilitate the requisite lubrication, each of said grooves 19, as illustrated in Figure 4, being what may be termed radially inclined.

From the foregoing description it is thought to be obvious that a bearing constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a piston body provided with inwardly disposed bosses and a wrist pin having its opposite end portions tapered, a bushing in each of the bosses and having a tapered bore to receive a tapered end portion of the pin, each bushing adapted to be forced inward toward the opposed bushing, and means holding the bushing in adjusted position within the bore of the boss, the outer extremity of the tapered portion of the pin extending out beyond the coacting portion of the bore of the bushing.

2. In combination with a piston body provided with inwardly disposed bosses and a wrist pin having its opposite end portions tapered, a bushing threaded in each of the bosses and having a tapered bore to receive the tapered end portion of the pin, each bushing having a recess on the periphery thereof, and a member supported by the piston and having a tapered portion engaging the recess of the bushing to hold the bushing in adjusted position.

3. In combination with a piston body having inwardly disposed bosses and a wrist pin having tapered end portions, bushings threaded within each of the bosses and having tapered bores to receive the tapered portions of the wrist pin, each of said bushings having circumferentially spaced grooves disposed lengthwise thereof, and means operatively supported by the piston body and selectively engaged within a groove of the bushing to hold the bushing against rotation.

4. In combination with a piston body having inwardly disposed bosses and a wrist pin having tapered end portions, bushings threaded within the bosses and having tapered bores to receive the tapered end portions of the pin, each of said bosses being continued by a flange, said flange having a kerf therethrough in communication with the bore of the boss, a locking plate slidably mounted within the kerf, the bushing being provided in its periphery with grooves, and means carried by the flange and coacting with the plate for moving the plate to engage within a groove of the bushing.

5. In combination with a piston body having inwardly disposed bosses and a wrist pin having tapered end portions, bushings threaded within the bosses and having tapered bores to receive the tapered end portions of the pin, each of said bosses being continued by a flange, said flange having a kerf therethrough in communication with the bore of the boss, a locking plate slidably mounted within the kerf, the bushing being provided in its periphery with grooves, a shank disposed through the flange and in threaded engagement therewith, the portion of the shank intersecting the kerf being tapered and having contact with the plate to force the plate into engagement with a groove of the bushing upon rotation of the shank in one direction.

6. In combination with a piston body having inwardly disposed bosses and a wrist pin having tapered end portions, bushings threaded within the bosses and having tapered bores to receive the tapered end portions of the pin, each of said bosses being continued by a flange, said flange having a kerf therethrough in communication with the bore of the boss, a locking plate slidably mounted within the kerf, the bushing being provided in its periphery with grooves, a shank disposed through the flange and in threaded engagement therewith, the portion of the shank intersecting the kerf being tapered and having contact with the plate to force the plate into engagement with a groove of the bushing upon rotation of the shank in one direction, and means for holding the shank against rotation.

7. In combination with a piston body having inwardly disposed bosses and a wrist pin having tapered end portions, bushings threaded within the bosses and having tapered bores to receive the tapered end portions of the pin, each of said bosses being continued by a flange, said flange having a kerf therethrough in communication with the bore of the boss, a locking plate slidably mounted within the kerf, the bushing being provided in its periphery with grooves, and means carried by the flange and coacting with the plate for moving the plate to engage within a groove of the bushing, said kerf being continued by a slot through the wall of the piston body.

8. In combination with a piston body having inwardly disposed bosses and a wrist pin having tapered end portions, bushings threaded within the bosses and having tapered bores to receive the tapered end portions of the pin, each of said bosses being continued by a flange, said flange having a kerf therethrough in communication with the bore of the boss, a locking plate slidably mounted within the kerf, the bushing being provided in its periphery with grooves, and means carried by the flange and coacting with the plate for moving the plate to engage within a groove of the bushing, said kerf being continued by a slot through the wall of the piston body, the end of the slot remote from the bushing being in communication with a second slot in the piston wall, said second slot being angular to the first slot.

9. In combination with a piston body having inwardly disposed bosses and a wrist pin having tapered end portions, bushings threaded within the bosses and having tapered bores to receive the tapered end portions of the pin, each of said bosses being continued by a flange, said flange having a kerf therethrough in communication with the bore of the boss, a locking plate slidably mounted within the kerf, the bushing being provided in its periphery with grooves, and means carried by the flange and coacting with the plate for moving the plate to engage within a groove of the bushing, said kerf being continued by a slot through the wall of the piston body, the end of the slot remote from the bushing being in communication with a second slot in the piston wall, said second slot extending beyond the opposite sides of the first slot and substantially at right angles thereto.

10. In a piston body provided with inwardly disposed bosses and a wrist pin having its opposite end portions tapered, a bushing threaded in each of the bosses and having a tapered bore to receive the tapered end portion of the pin, and means for holding the bushing against rotation, the outer end of the pin extending outward beyond the coacting bushing and the inner bell end of the bushing extending inward beyond the coacting tapered portion of the wrist pin.

In testimony whereof I hereunto affix my signature.

BURDETT B. BRIGGS.